(12) United States Patent
Brin et al.

(10) Patent No.: US 6,185,559 B1
(45) Date of Patent: *Feb. 6, 2001

(54) METHOD AND APPARATUS FOR DYNAMICALLY COUNTING LARGE ITEMSETS

(75) Inventors: Sergey Brin, Stanford; G D Ramkumar; Shalom Tsur, both of Mountain View, all of CA (US)

(73) Assignee: Hitachi America, Ltd., Tarrytown, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/853,757

(22) Filed: May 9, 1997

(51) Int. Cl.$^7$ .................................................. G06F 17/30
(52) U.S. Cl. ....................... 707/6; 707/3; 707/4; 707/5; 707/102; 707/104
(58) Field of Search ................. 707/1–10, 100–104, 707/200–206

(56) References Cited

U.S. PATENT DOCUMENTS

| | | | |
|---|---|---|---|
| 4,053,871 | 10/1977 | Vidalin et al. | 340/146.2 |
| 4,255,796 | 3/1981 | Gabbe et al. | 364/900 |
| 4,451,901 | 5/1984 | Wolfe et al. | 364/900 |
| 4,817,036 | 3/1989 | Millet et al. | 364/900 |

(List continued on next page.)

OTHER PUBLICATIONS

Coaxing Meaning Out of Raw Data, John W. Verity, *Business Week*, Feb. 3, 1997, pp. 134–135.

Dynamic Itemset Counting And Implication Rules for Market Basket Data, Sergey Brin, Rajeev Motwani, Jeffrey D. Ullman and Shalom Tsur, *Sigmod 97* Submission #246, published May 13, 1997.

Fast Algorithms for Mining Association Rules, Rakesh Agrawal and Ramakrishnan Srikant, *Proceedings of the 20$^{th}$ VLDB Conference*, Santiago Chile, 1994.

Parallel; Mining of Association Rules: Design, Implemenation and Experience, Rakesh Agrawal and John C. Shafer, *IBM Research Report* Feb. 1, 1996.

Concept Extraction: a Data–mining Technique, Vance Faber, Judith G. Hochberg, Patrick M. Kelly, Timothy R. Thomas and James M. White, *Los Alamos Science*, Nov. 9–1994.

Sampling Large Databases for Association Rules, Hannu Toivonen, *Proceedings of the 22$^{nd}$ VLDB Conference*, Mumbai (Bombay), India, 1996.

*Primary Examiner*—Ruay Lian Ho
(74) *Attorney, Agent, or Firm*—Flehr Hohbach Test Albritton & Herbert LLP (57) ABSTRACT

The present invention is directed to a data mining method and apparatus that dynamically initiates the counting of sets of items (itemsets) at any time during the pass over the records of a database and terminates the counting at the same location in the next pass. In this manner, the present invention begins to count itemsets early and finishes counting early while keeping the number of different itemsets which are being counted in any pass relatively low.

20 Claims, 9 Drawing Sheets

U.S. PATENT DOCUMENTS

| | | | |
|---|---|---|---|
| 4,991,087 | 2/1991 | Burkowski et al. | 364/200 |
| 5,072,376 | 12/1991 | Ellsworth | 395/650 |
| 5,222,234 | 6/1993 | Wang et al. | 395/600 |
| 5,226,165 | 7/1993 | Martin | 395/600 |
| 5,263,159 | 11/1993 | Mitsui | 395/600 |
| 5,278,980 | 1/1994 | Pederson et al. | 395/600 |
| 5,377,348 | 12/1994 | Lau et al. | 395/600 |
| 5,410,692 | 4/1995 | Torres | 395/600 |
| 5,454,105 | 9/1995 | Hatakeyama et al. | 395/600 |
| 5,457,794 | 10/1995 | Azumatani et al. | 395/600 |
| 5,469,354 | 11/1995 | Hatakeyama et al. | 364/419.19 |
| 5,537,586 | 7/1996 | Amram et al. | 395/600 |
| 5,544,049 | 8/1996 | Henderson et al. | 364/419.19 |
| 5,604,899 | 2/1997 | Doktor | 395/603 |
| 5,664,174 * | 9/1997 | Agrawal et al. | 707/6 |
| 5,742,811 * | 4/1998 | Agrawal et al. | 707/6 |
| 5,764,975 * | 6/1998 | Taniguchi et al. | 707/6 |
| 5,787,274 * | 7/1998 | Agrawal et al. | 707/102 |
| 5,787,425 * | 7/1998 | Bigus | 707/6 |
| 5,799,311 * | 8/1998 | Agrawal et al. | 707/102 |
| 5,930,803 * | 7/1999 | Becker et al. | 707/104 |
| 5,933,818 * | 8/1999 | Kasravi et al. | 706/12 |

* cited by examiner

METHOD AND APPARATUS FOR DYNAMICALLY COUNTING LARGE ITEMSETS

FIELD OF THE INVENTION

The present invention relates generally to a method and apparatus for analyzing database records to uncover relationships between various items contained within the records, and in particular to a method and apparatus for counting all sets of items dynamically within a database of individual records using fewer passes over the records than conventional data mining methods.

BACKGROUND OF THE INVENTION

In recent years, the progress of information automation has increased the computer databases of modem businesses to the point where a blizzard of numbers, facts and statistics are collected and stored, but less information of any significance is extracted from the massive amounts of data. The problem is that conventional computer databases are powerful in the manner in which they house data, but unimaginative in the manner of searching through the data to extract useful information. Simply stated, the use of computers in business and scientific applications has generated data at a rate that has far outstripped the ability to process and analyze it effectively.

To address this problem, a practice known as data "mining" is being developed to identify and extract important information through patterns or relationships contained in available databases. Humans naturally and quickly "mine" important concepts when interpreting data. A person can scan a magazine's table of contents and easily select the articles related to the subject of interest. A person's ability to extract and identify relationships goes beyond the simple recognizing and naming of objects, it includes the ability to make judgments based on overall context or subtle correlations among diverse elements of the available data. Computers on the other hand, cannot efficiently and accurately undertake the intuitive and judgmental interpretation of data. Computers can, however, undertake the quantitative aspects of data mining because they can quickly and accurately perform certain tasks that demand too much time or concentration from humans. Computers, using data mining programs and techniques are ideally suited to the time-consuming and tedious task of breaking down vast amounts of data to expose categories and relationships within the data. These relationships can then be intuitively analyzed by human experts.

Data mining techniques are being used to sift through immense collections of data such as marketing, customer sales, production, financial and experimental data to "see" meaningful patterns or regularities and identify what is worth noting and what is not. For example, the use of bar-code scanners at supermarket checkouts typically results in millions of electronic records which, when mined, can show purchasing relationships among the various items shoppers buy. Analysis of large amounts of supermarket basket data (the items purchased by an individual shopper) can show how often items are purchased together, such as, for example, fruit juice, children's cereals and cookies. The results can be useful for decisions concerning inventory levels, product promotions, pricing, store layout or other factors which might be adjusted to changing business conditions. Similarly, credit card companies, telephone companies and insurers can mine their enormous collections of data for subtle patterns within thousands of customer transactions to identify risky customers or even fraudulent transactions as they are occurring. Data mining can also be used to analyze the voluminous number of alarms that occur in telecommunications and networking alarm data.

The size of the data set is essential in data mining: the larger the database, the more reliable the relationships which are uncovered. Large databases, unfortunately, have more records to shift through and require many passes through the records or multiple passes through each record to uncover any regularities. The number of items for which the relationships are sought is also important to the efficiency of data mining operations: the larger the number of items, the more passes through the records that are required to extract reliable information.

Consider data mining of supermarket basket data as an example. A supermarket contains a set of items (its products), of which each shopper purchases a subset. In analyzing the volumes of subsets, it is desirable to find the "significant" purchases or large itemsets (sets of items, such as all transactions that included the purchase of fruit juice). A large itemset contains items (fruit juice, cookies) that appear in at least a preset number of subsets (customer purchases). In data mining parlance, this number is called the support threshold.

The best known method for finding large itemsets is the Apriori method described in the publication, *Fast Algorithms of Mining Association Rules*, by R. Agrawal and R. Srikant—Proceedings of the $20^{th}$ VLDB Conference; Santiago, Chile, 1994. To discover large itemsets, the Apriori method makes multiple passes over the transaction records (see FIG. 1). In the first pass, the Apriori method counts the support of individual items and determines which of them are large, i.e., have minimum support. In each subsequent pass, this method starts with a seed set of itemsets found to be large in the previous pass. This seed set is used for generating new potentially large itemsets, called candidate itemsets, and the actual support for these candidate itemsets are counted during the pass over the data. At the end of the pass, the candidate itemsets which are actually large are determined, and they become the seed for the next pass. This process continues, pass after pass over the data, until no new large itemsets are found.

The Apriori method generates the candidate itemsets to be counted in a pass by using only the itemsets found to be large at the end of the previous pass—without considering the transactions during its pass over the database. The basic notion is that any subset of a large itemset must be large. Therefore, the candidate itemsets can be generated by joining large itemsets having less items, and deleting those that contain any subset that is not large. This procedure results in the generation of the final number of candidate itemsets at the end of a pass over the database.

As can be seen, the shortcoming of the Apriori method is that as the size of the database increases, or the number of items searched increases, so does the number of passes over the database records, from top to bottom. In very large databases, the database activity overhead due to the reported passes can reduce the execution time and therefore the efficiency of this method to an undesirable level.

A more recent data mining technique that attempts to avoid the limitations of the Apriori method is that disclosed by H. Toivonen in the paper, *Sampling Large Databases for Association Rules*, H. Toivonen, Proceedings of the $22^{nd}$ VLDB Conference, Bombay, India, 1996. Toivonen presents database mining methods which attempt to make only one full pass over the database. The Toivonen method randomly picks a sample record from the database, uses it to determine the relationship or pattern on the assumption that it probably holds for the entire database, and then verifies the results with the rest of the database.

The Toivonen method partitions the database into sections small enough to be handled in main memory, thereby reducing I/O activity to the database (which normally resides on disk). Then, an evaluation for large itemsets for a random part is performed in main memory without further database activity. The method uses the random sample and makes a series of passes over the data to determine which items are frequently found. Each pass builds on the previous collection of frequently found items until the method efficiently finds a superset from the collection of frequently found sets. In order to increase accuracy, the superset is determined by applying this "level-wise" method on the sample in main memory, and by using a lowered frequency threshold. The method then uses the rest of the database to compute the exact frequencies of the sets found. This approach attempts only one full pass over the database, and two passes in the worst case.

Basically, this method uses a random sample of the relation to find approximate regularities, and applies those results to the entire database. The significant shortcoming of the Toivonen method, however, is that it trades off accuracy against the efficiency achieved by reducing database activity.

Because of the shortcomings of the current data mining techniques, what is needed is a method and apparatus of accurately finding large itemsets while increasing the efficiency of the database activity through a reduction in the number of passes over the database.

Accordingly, it is an object of the present invention to provide a data mining method and apparatus which reduces the number of passes made over the database while keeping the number of different itemsets which are counted in any pass low, as compared with the prior art methods.

It is still another object of the present invention to accomplish to above-stated objects by utilizing a data mining method and apparatus which is simple in design and use, and efficient to perform with regard to database activity.

The foregoing objects and advantages of the invention are illustrative of those advantages which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, a method is disclosed for dynamically searching a collection of data records to detect records having sets of items (itemsets) and to form association rules corresponding to the itemsets detected. The method includes the steps of: (i) reading data records in a seriatim manner; (ii) incrementing a separate counter for each itemset detected in a record; (iii) reading records that have already been detected as containing an itemset, starting with any record having a first itemset and continuing in a sequential manner through the records identified as having a first item set; (iv) generating new itemsets; (v) incrementing separate counters for each itemset detected in a record; (vi) returning to the beginning of any unread records after reading the last record in the collection of data records; (vii) repeating the steps above until every itemset has been counted; and (viii) creating association rules from the itemsets counted in steps above. The foregoing method may be performed serially in a single processor system, or alternatively with parallel processors detecting individual itemsets and consolidating itemset data throughout the process.

According to another broad aspect of the invention, a programmable general purpose computer apparatus is disclosed for dynamically searching a file of records collectively stored in an electronic database, wherein the records contain at least one item. The search dynamically determines sets of items (itemsets) and searches for the generated itemsets among the records by starting at any record and reading the records in a sequential flow until all records before and after the initial record in the file are read. The apparatus of the present invention includes a processor for performing decision making, control operations and data manipulation; an array of memory storage units having address inputs and data inputs and outputs, for storing the records in different locations within the memory storage units during the search; an address generation unit having address outputs coupled to the address inputs of the memory storage units, for generating addresses to access different locations within the memory storage units; and an interface unit having address inputs connected to the address outputs of the address generation unit.

DETAILED DESCRIPTION OF THE PREFERRED EMBODIMENTS OF THE INVENTION

The present invention contemplates a data mining method and apparatus that dynamically initiates the counting of sets of items (itemsets) at any time during the pass over the records of a database and terminates the counting at the same location in the next pass. In this manner, the present invention begins to count itemsets early and finishes counting early while keeping the number of different itemsets which are being counted in any pass relatively low.

Figure 2:
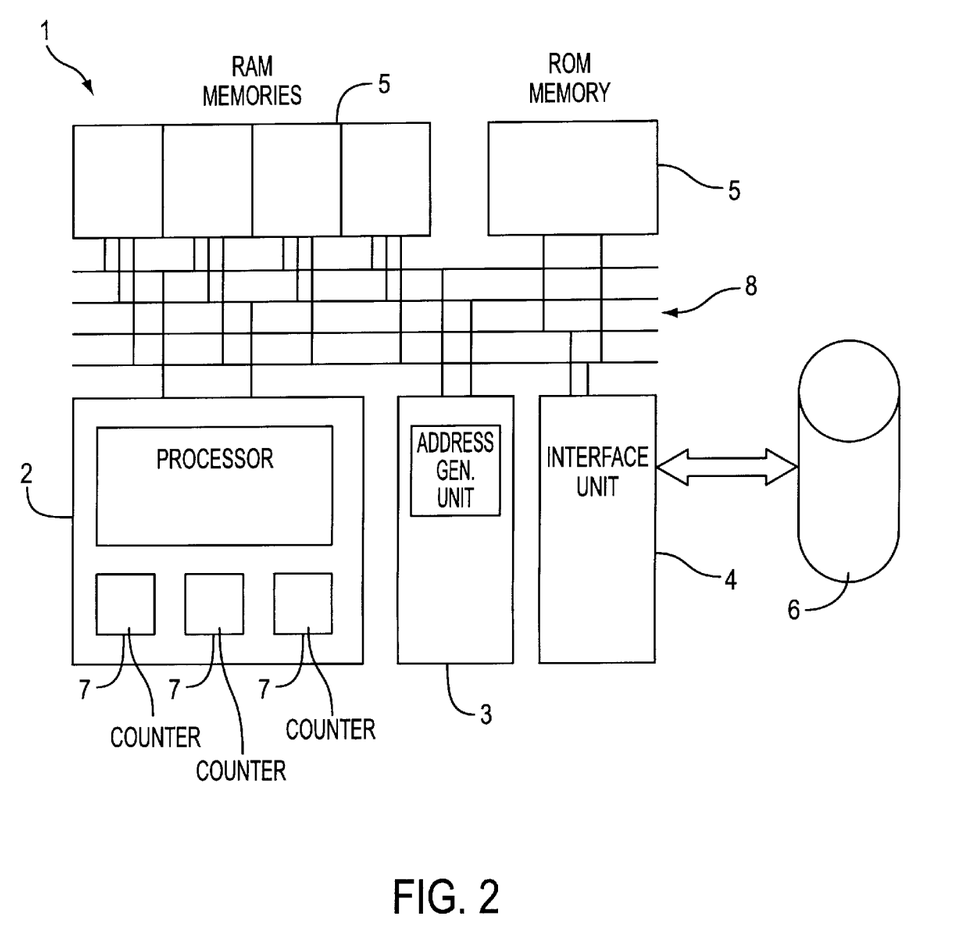
FIG. 2 is a block form diagram of an implementation of the dynamic itemset counting system on a general purpose computer.

Referring now to the drawings, in which like numerals refer to like components or steps, there is disclosed in FIG. 2 broad aspects of a preferred embodiment of the present invention. FIG. 2 discloses a general arrangement of a data mining system, referred to herein as a Dynamic Itemset Counting ("DIC") system 1, for counting large itemsets in just a few passes (usually less than two) over a database of transactions.

In a preferred embodiment of the present invention, the DIC system 1 works in conjunction with a general purpose computer or similar processor based electronic device for processing large buffers of data by quickly executing repetitive operations. However, it should be understood that the references to specific components typically found in general purpose computers, related to but not forming part of the invention, are provided for illustrative purposes only. References to such computer components are provided for ease in understanding how the present invention may be practiced in conjunction with known types of data processing applications. Moreover, the various components of the DIC system 1 contemplated by the present invention may be implemented by direct electrical connection through customized integrated circuits, or a combination of circuitry and programming, using any of the methods known in the industry for providing the functions described herein without departing from the teachings of the invention. Those skilled in the art will appreciate that from the disclosure of the invention provided herein, commercial semiconductor integrated circuit technology would suggest numerous alternatives for actual implementation of the functions of the DIC 1 that would still be within the scope of the present invention.

According to one embodiment of the present invention, the DIC 1 contains, in pertinent part, a processor unit 2 (preferably a microprocessor), an address generation unit 3, and an interface unit 4. The DIC 1 also contains data storage memory arrays 5 which may be composed of read only memory (ROM) and random access memory (RAM) storage locations, and preferably a combination of both. The processor 2, address generation unit 3, interface unit 4 and the memory arrays 5 are all interconnected via a suitable communication bus 8 as is practiced in the industry. The memory arrays 5 have address inputs and data inputs and outputs for storing and retrieving data from different storage locations within the arrays 5. The address generation unit 3 has address outputs coupled to the address inputs of the memory array 5 and to address inputs of the interface unit 4. The interface unit 4 also has address outputs connected to address inputs of external mass storage units 6.

The processor 2 provides decision making and control operations, and further includes a plurality of registers 7, composed of both general purpose storage registers and specific purpose registers such as accumulators, counters and pointers. As practiced in the industry, the processor 2 communicates through the interface unit 4 to external mass storage units 6 such as disk drive units. Similar to the memory 5, the disk drive units 6 include data inputs, data outputs, and address inputs so that data can be read from or written to the disk drives 6. It is anticipated that the database will be maintained on the disk drives 6, with portions of the database being copied into the memory arrays 5 so that the processor 2 can manipulate the data.

Figure 1:
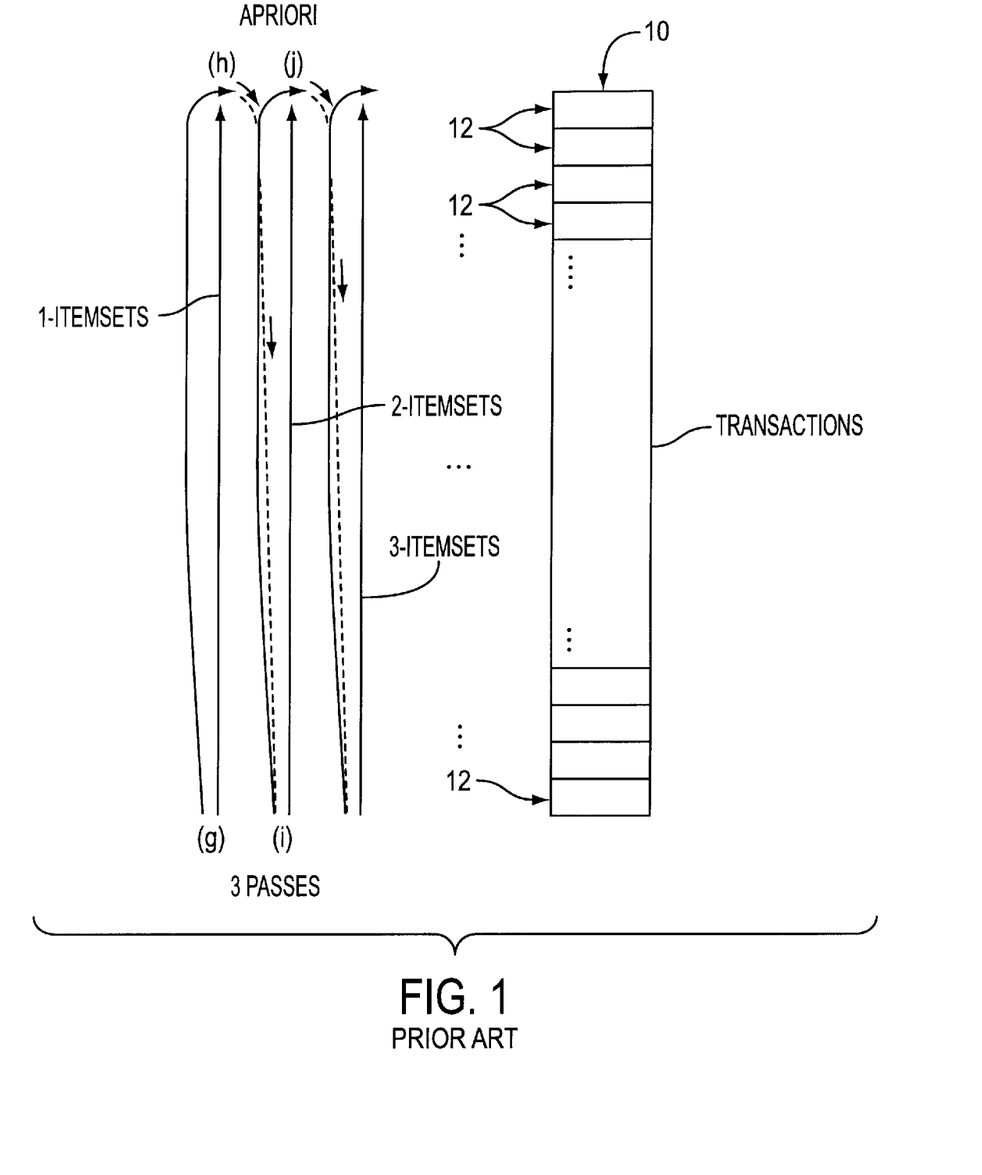
FIG. 1 is a diagram of an Apriori prior art data mining arrangement.

Turning briefly to FIG. 1 for background purposes, there is shown an electronic database or set of data transactions 10 containing a sequential plurality of files or records 12 that represent individual transactions. The prior art Apriori method of data mining shown therein begins with the counting of recognized 1-itemsets (sets having one item; e.g., in the supermarket basket case the one item would be the transactions having a fruit juice purchase) at the start of the transactions (g). The process continues until every record 12 is checked, culminating at the end (h) of the data transactions 10. After a first pass over the data transactions 10, the process starts sifting through the records 12 for 2-itemsets (itemsets containing two items, such as, for example, fruit juice and cookies). The process starts at the beginning of the transaction records 12 having 1-itemsets (i) and continues through the records 12 until it reaches the end (j) of the data transactions 10. The same process of restarting from the beginning of the data transactions 10 for generating a new itemset and counting it is repeated for 3-itemsets, and so on.

In the present invention (referring now to FIG. 3), the processor 2 can start at any of the transaction records 12 to begin detecting and keeping a count of the itemsets that are present in the data transactions 10. In the example shown in FIG. 3, the process of reading each record 12 in the data transactions 10 begins at the first record (b) and continues in a substantially sequential flow for counting 1-itemsets over the data transactions 10 through the last record (c) until all records 12 have been read. However, as noted, it is not required that the processor 2 begin with the first record 12, and the processor 2 can start at any record 1+x where x is any whole integer. In the case where the processor 2 starts with a record 12 located 1+x, when the last record located at (c) is reached, the processor 2 returns to the first record 12 of the data transactions 10 at location (b) and continues the search in a seriatim manner until the record located at 1+x is reached. This flexibility in the manner of where to initiate the reading of records 12 will be further exemplified below in the processes for extracting multiple itemsets within the data transactions 10.

Figure 3:
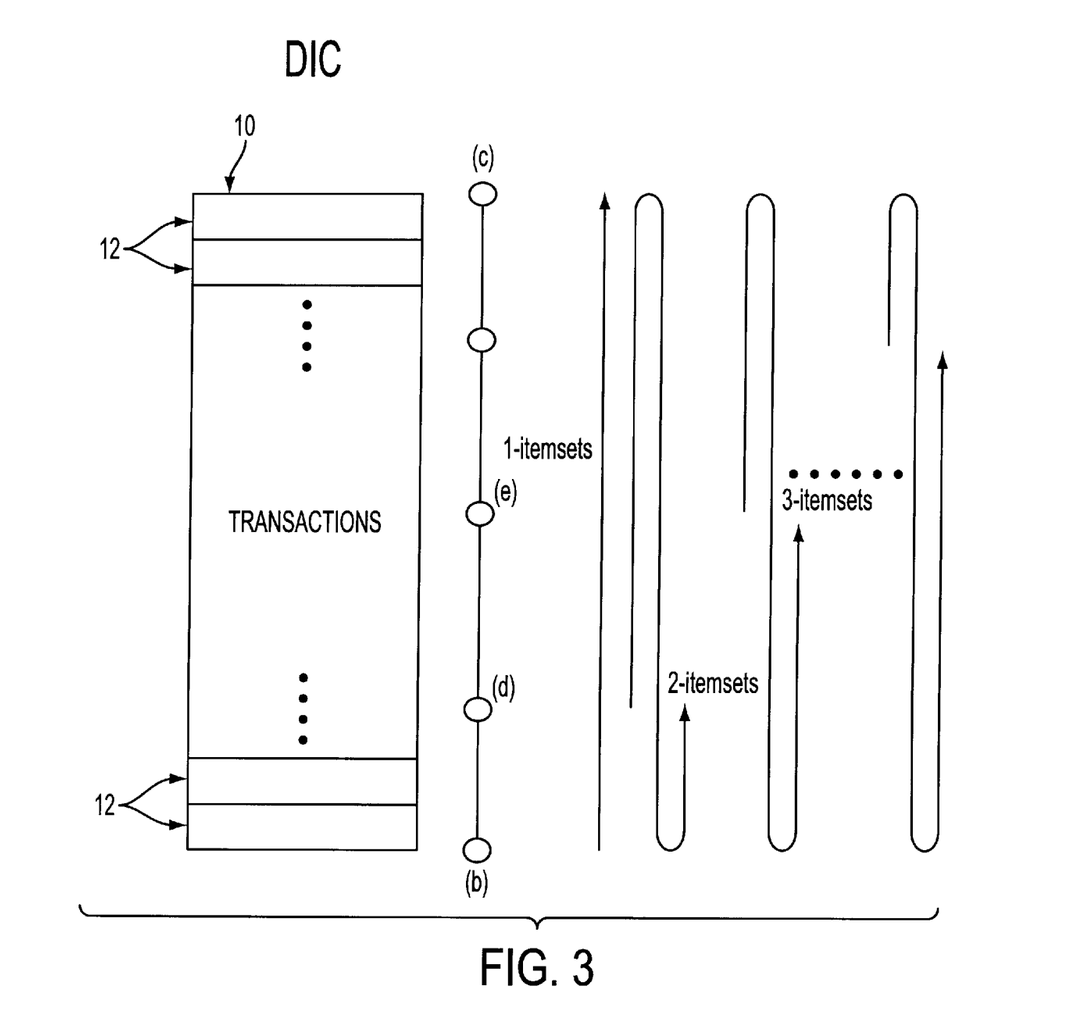
FIG. 3 is a diagram a serial implementation of the dynamic itemset counting system of the present invention.

After starting the process of searching for 1-itemsets, the search for, or recognition of, 2-itemsets that can be detected will begin. The items that make up a recognizable 2-itemset may be the item from the 1-itemset and any other item that has appeared with frequent regularity in the records 12 that have been read so far. Alternatively, the second item to be "recognized" in the search may be programmed at the start of the search. Advantageously, itemsets can be dynamically generated during the search pass over the data transactions 10 without waiting for the pass for 1-itemsets to be completed.

The search for 2-itemsets may begin at a record location (d), and preferably after the search for 1-itemsets has passed that record location (d). The record location (d) is separated from record location (b) by M number of records 12 in the data transactions 10, M being preferably as small as is feasible for generating new itemsets based on what regularities have already been uncovered thus far. (For most large databases, it was empirically found that M being between 300 and 1000 worked well). For the 2-itemset search, the process will search through only the records 12 that have already been identified as containing the 1-itemsets. By staggering the search of 2-itemsets until after the search of 1-itemsets has started, the process eliminates the data activity required to search those records known to not have the 1-itemsets and therefore cannot meet the requirements for a 2-itemset record 12. After the search process reaches the record 12 at location (c), the search for 1-itemsets is completed and the search for 2-itemsets loops around or recirculates, to continue with the record 12 at location (b). The search for 2-itemsets continues until it finishes with the record 12 at location (d).

The identification of, and the search for 3-itemsets operates in the same staggered, dynamic manner, starting with a record location subsequent in the process to (d), and in FIG. 3 identified as location (e). The initiation of the 3-itemsets search process occurs before the end of the previous searches and trails the start time of the 2-itemset search, which in turn trails the start time of the search for 1-itemsets. This staggered scheduling allows the process to efficiently uncover 3-itemsets and save on database activity by searching only the records 12 already identified as having 2-itemsets. After reaching the record 12 located at (c), the process loops around to the record 12 located at (b) and continues until it reaches the record 12 at location (e).

When each record 12 is read, the DIC 1 will classify the itemset that is detected into one of four classes: (i) suspected large, (ii) suspected small, (iii) confirmed large, or (iv) confirmed small. Suspected "large" or "small" itemsets are those which are still being counted, and confirmed itemsets are designated as such when all of the itemsets, including any new ones which may be generated during the searches, are read and counted. When the processor 2 reads, for example, the first record 12 found at location (b), it classifies the record 12 as "suspected small" if the record 12 meets the criteria for the 1-itemsets, and "confirmed large" if the record 12 is empty.

Separate counters or registers 7 are used to keep track of the number of records 12 designated in each of the four classifications. These counters may be special purpose registers 7 to monitor and keep track of each itemset and its classification count, or they may be a designated area of memory 5 provided specifically for the purpose of maintaining itemset data. In a preferred embodiment of the present invention, special purpose registers 7 are used as fast counters. As each record 12 is read, the appropriate counter and classification registers 7 are incremented. Once a suspected small itemset has a count that exceeds a predetermined support threshold, the itemset becomes classified as suspected large. Additional registers 7 are available to keep track of new itemsets as they are dynamically generated.

When the processor 2 has read through all of the records 12 for a particular itemset (which includes all records 12 within a complete loop of the data transactions 10), its suspected large or suspected small classification becomes a confirmed large or confirmed small classification, whichever the case may be. In the case of itemsets having at least one item in common, a superset may be created by combing such itemsets. Additional registers 7 are provided for keeping track of any superset which may have been generated during the search and which has all of its subsets classified as suspected large or confirmed large. Such a superset is initially classified as suspected small until a support threshold for the superset is reached.

The arrangement provided for in the present invention to keep track of the plurality of itemsets as they are created and detected is a hash tree data structure with additional information figuratively provided at each node of the tree. As practiced in the industry, the hash tree employed by the present invention is a tree structure which stores and retrieves data based on a transformation that takes a variable sized input and returns a fixed size bit string (representing data).

Figure 4:
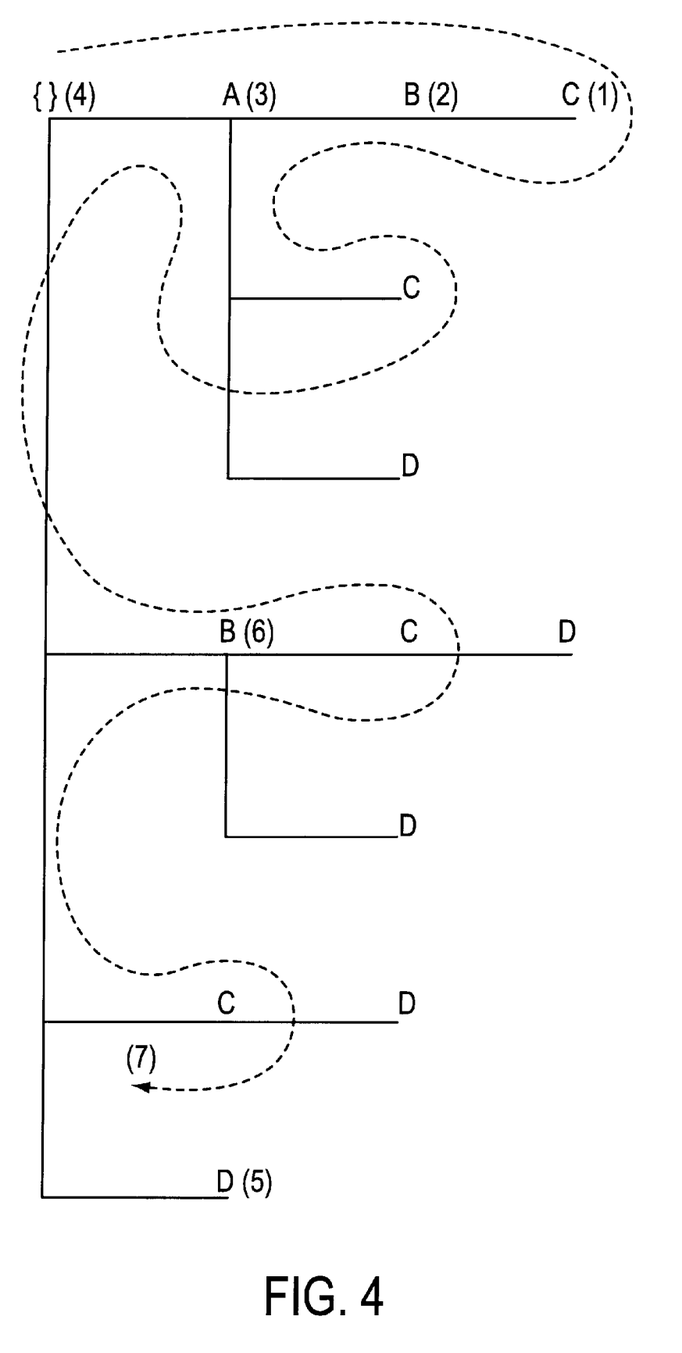
FIG. 4 is a perspective diagram of a hash tree arrangement for serial processing in one embodiment of the present invention.

FIG. 4 shows an exemplary hash tree structure for use with the present invention. Here, the processor 2 is concerned with identifying the itemsets containing exemplary items A, B, C and D. An empty itemset is represented at the root node (4) by the { } symbol. Each itemset is represented by the path from the root node (4) to the respective node. As can be seen, all itemsets (A, B, C and D) are connected to the root node (4). Itemsets having elements ABC, for example, are represented by the path from the root node (4) to node (1), and itemsets having elements AB are represented by the path to node (2). Each of the itemsets which are being counted or have been counted has a path to a specific node associated with it, as do all of its prefixes. Branches also represent the subsets (such as BC at node (6), and D at node (5)).

The dotted line (7) shown in FIG. 4 represents the path through the data tree for an exemplary itemset ABC. The nodes to the left of the path correspond to the registers 7 that must be incremented by the processor 2 during each pass over the records 12. For an itemset of elements ABC, the registers 7 A, AB, ABC, AC, B, BC and C are incremented in this order.

Figure 5:
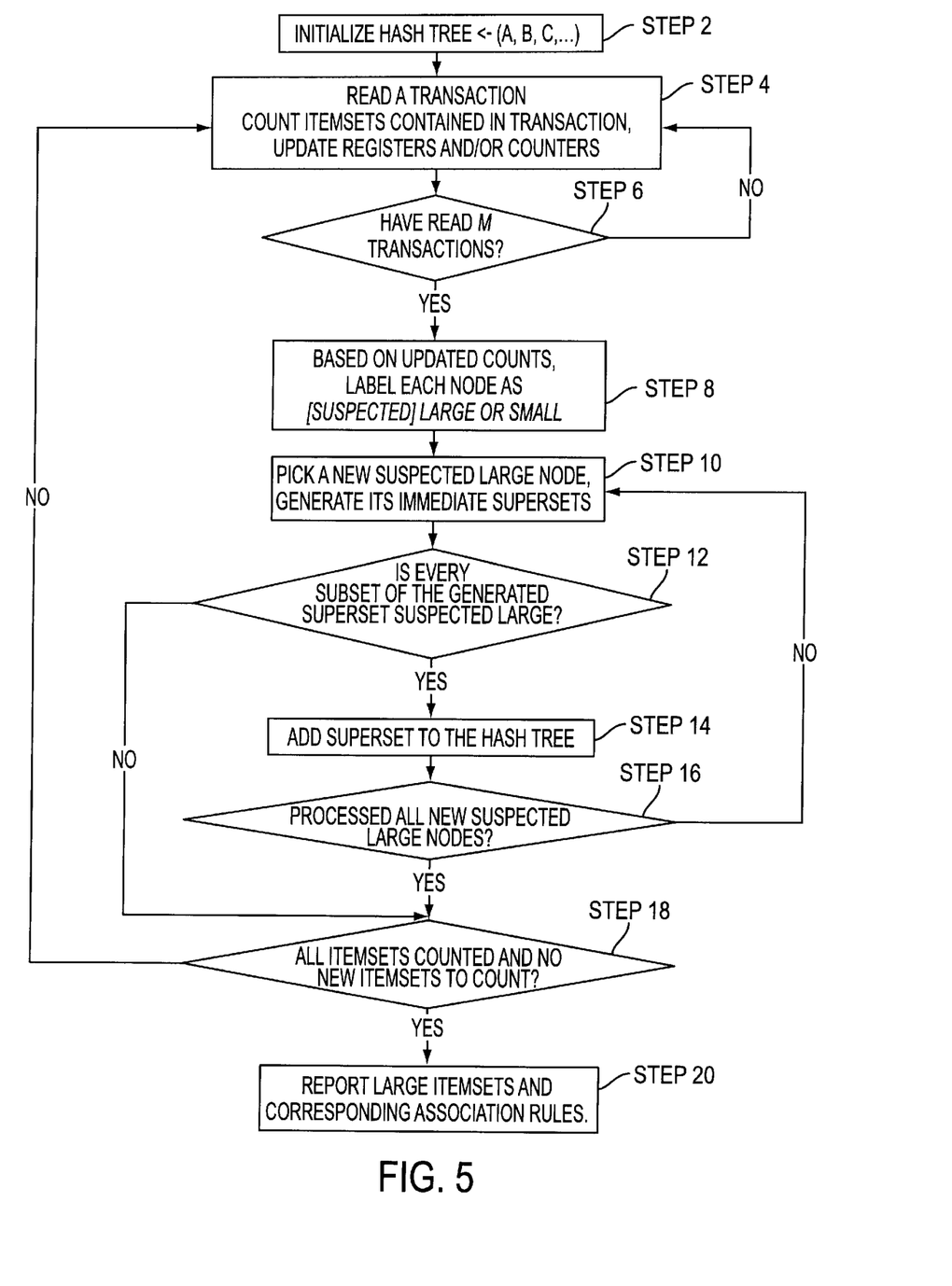
FIG. 5 is a flowchart illustrating the serial operation of the dynamic itemset counting system according to one embodiment of the present invention.
Figure 6:
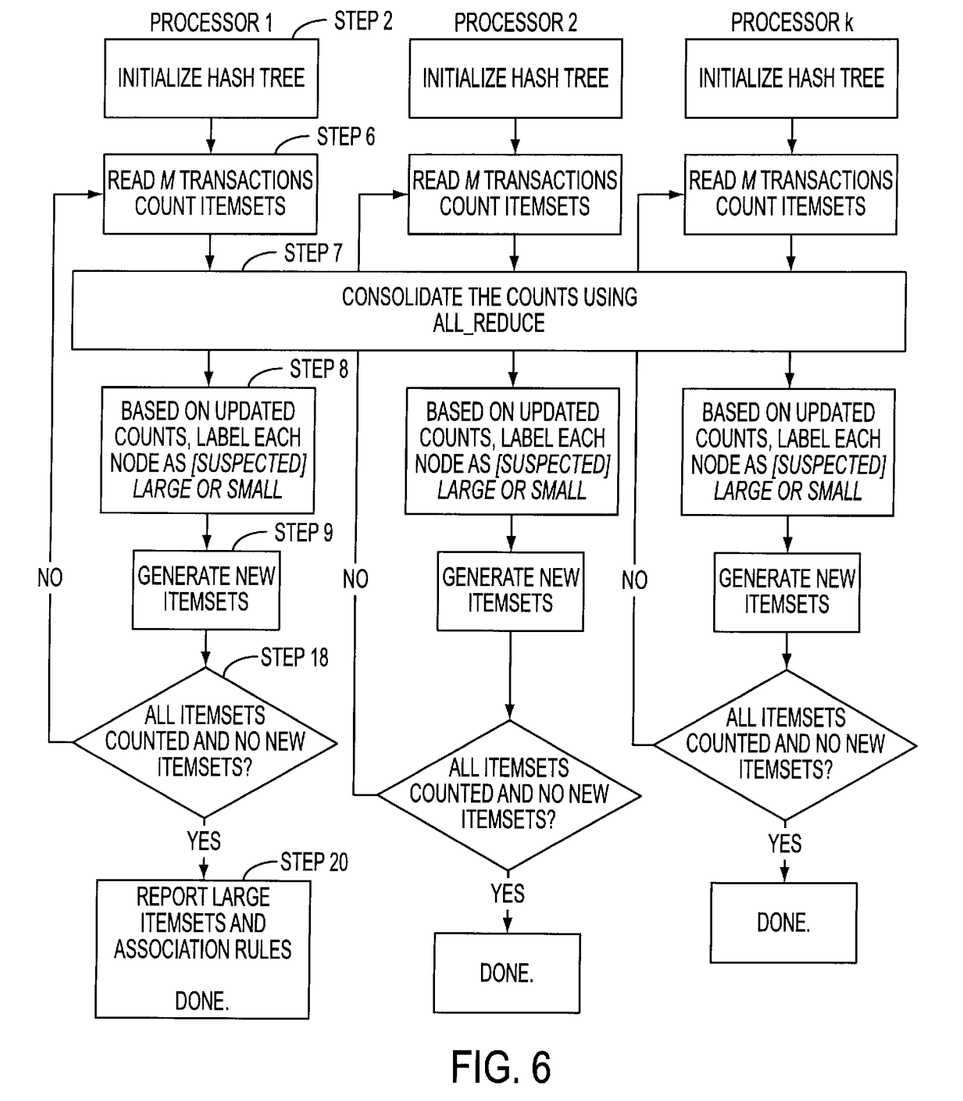
FIG. 6 is a flowchart illustrating the parallel operation of the dynamic itemset counting system according to another embodiment of the present invention.

To better understand the implementation of the hash tree functions, several process flowcharts are provided in FIGS. 5 and 6. FIG. 5 is a flowchart illustrating the operation figuratively represented by the hash tree structure in FIG. 4. The process begins by initializing the hash tree nodes (A, B, C . . . ), and the counters or registers 7 associated therewith (Step 2). The processor 2 then reads a transaction record 12 and, initially, counts the 1-itemsets contained in record 12. For every incidence of a 1-itemset, the corresponding register 7 is updated. After each record 12 is read, a separate register is also updated to keep track of the number of transactions (M) read. In one preferred embodiment of the present invention, M is set to 1,000.

After M transaction records 12 are read (Step 6), support threshold levels are compared to the itemset count in the register 7, and based upon the count, each node of the hash tree is identified as suspected large or suspected small (Step 8). From there, the next suspected large itemset (2-itemset, 3-itemset, etc.) is generated, including its immediate supersets (Step 10). As mentioned, new suspected itemsets (small, large) may be generated in advance by targeting specific items for detection. It may be desirable to search for specific 2-itemsets based on known 1-itemsets. For example, the producer of children's cereals may be looking for the association between sales of cereals and cookies (in the 2-itemset). In such a case, the itemsets to be generated for each pass may be programmed or selected in advance.

It is more likely (and preferable) that the DIC 1 itself generate the new suspected itemsets based on the counts of items uncovered in previous passes over the records 12 so that unknown regularities may be uncovered. In addition, the DIC 1 can generate supersets from itemsets that share at lest one item. A 2-itemset containing items A and B and a 2-itemset containing items A and C can be combined into a superset of items A, B and C. The itemsets (AB, AC) that make up a superset when combined are, of course, subsets of the superset (A, B, C).

Every subset of the superset generated in Step 10 is examined to see if each one is suspected large (Step 12). If every subset is a suspected large subset, the superset is added as a branch to the hash tree structure of FIG. 4 (Step 14). Steps 10 through 14 are repeated until the processor 2 has read all records 12 corresponding to all of the suspected large itemsets for each of the suspected large nodes of the hash tree (Step 16). In the case where one of the subsets of a superset is not suspected large (see Step 12), then that superset is not added to the hash tree (Step 14).

When all records 12 for all uncovered itemsets are read and there are no new itemsets to count (Step 18), the large itemsets are confirmed (as are the small ones) and reported. From the large itemsets uncovered, association rules are generated with respect to the frequency that individual items (Step 20) appear in the same transaction records 12. As can be appreciated by those skilled in the art, the association rules generated through the process outlined in FIG. 5 and structured according to the hash tree in FIG. 4 will generate rules in the form that if $A_1$ is true, and $A_2$ is true, . . . until $A_k$ is true, then $C_1$ is true, $C_2$ is true and so on until $C_k$ is true. For any itemset generated, the DIC 1 will generate many association rules related to the probability of individual items appearing as itemsets.

Using the hash tree structure of FIG. 4, the association rules generated for an itemset containing elements ABC when the database passes are completed in Step 20 of the process outlined in FIG. 5, may include AB→C, A→BC, BC→A and AC→B. Current association rule conventions hold that each rule provide a subset of the itemset in the left hand side of the equation (before the → or "then" connector) as the antecedent part, and the remaining subset on the right hand side of the formula.

In the supermarket basket example given earlier, if an itemset ABC corresponds to the items fruit juice, cookies and children's' cereals, then the generated association rule BC→A translates into the finding that customers purchasing cookies and children's' cereals also purchase fruit juice x amount of times, where x is presumably above the predetermined support threshold. Advantageously, the association rules generated by the DIC 1 of the present invention will be done efficiently (usually less than two passes over the entire database) and accurately (every record will have been read at least once for all itemsets). However, not all rules generated may be of equal importance, and additional filtering devices already known to those in the art may be employed to identify those rules that are of value. For example, filtering techniques such as confidence measurement or gauging may be employed in the present invention without departing from its scope.

In a second embodiment of the present invention, the DIC 1 employs a plurality of processors 2 so that the data transactions 10 can be read in parallel. The present embodiment takes into account the fact that since the process performed by the DIC 1 consists basically of reading a plurality of transaction records 12, and of processing the itemset counts that were read, the overall process time can be reduced by using parallel processors 2 to reduce the time consumed in the record 12 reading phase.

Referring to FIG. 6, the parallel process will be further described. In the preferred embodiment of the invention, the data transactions 10 are divided equally among the number of processors 2. This combines the processing power of p processors 2 that can read p times as many transactions together as compared to what one processor 2 can do in the same time period. The process starts out like the serial process described above, by initializing the hash tree arrangement (Step 2). Here, each processor 2 has a separate, but like, hash tree structure to work with.

The processors 2 then read through M transaction records 12 individually counting separate itemsets in a parallel or concurrent manner (Step 6). The first processor 2 will count the 1-itemsets, the second processor 2 will count the 2-itemsets, and so on. Of the M transactions, a single processor 2 reads M/p bytes of transactions (where, as mentioned above, p is the number of processors). Preferably, each processor 2 reads the same number of bytes before completing M transaction records 12. That way, each of the processors 2 takes approximately the same amount of time to process transaction records 12 totaling a given number of bytes.

Figure 7:
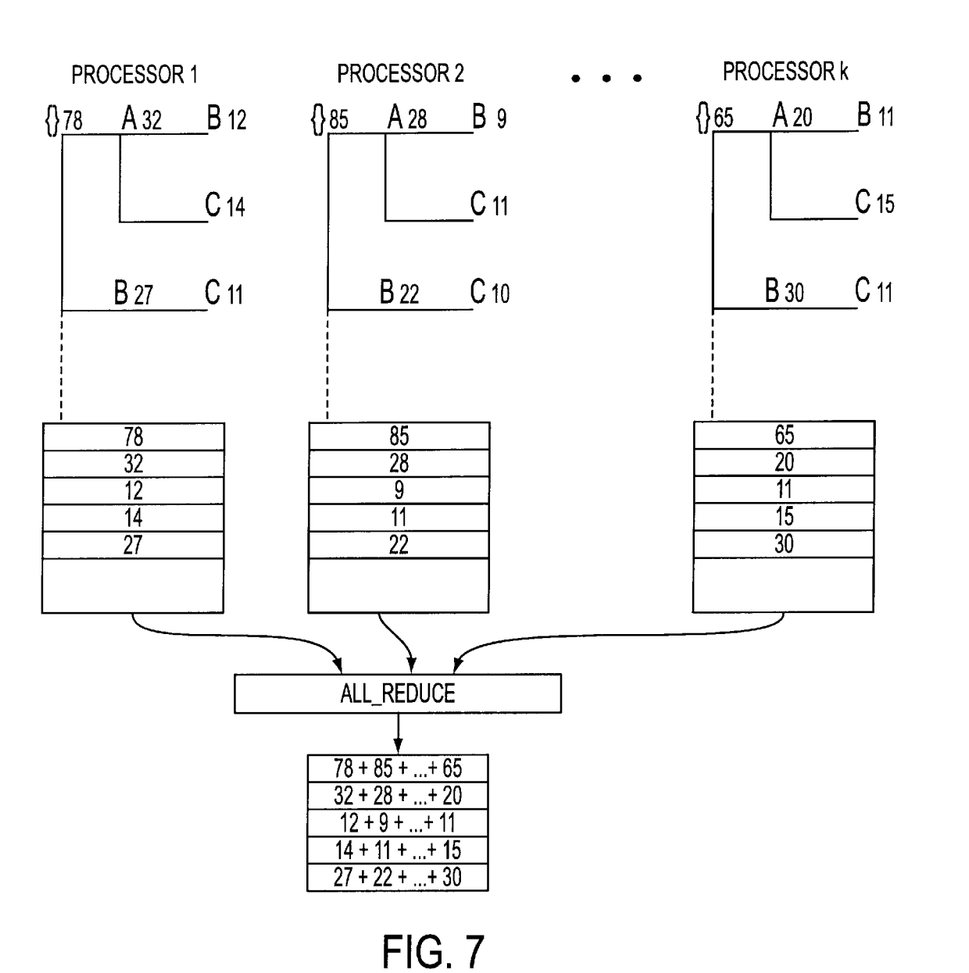
FIG. 7 is a perspective diagram of a hash tree arrangement for parallel processing in one embodiment of the present invention.

After each of the processors 2 have read their corresponding M transaction records 12, a synchronization among the processors 2 is performed to combine the itemset counts and to process new itemset counts (Step 7). This step consists of two parts: the first part provides for combining the counts of the itemsets that have been counted by each processor 2 with the itemset counts provided by all of the other processors 2; the second part consists of updating the counts to generate new itemsets that must also be counted by the processors 2 during the readings of the next M transaction records 12. At this step, the processors 2 utilize their identical hash tree structures (see FIG. 7, in combination with FIG. 6) which will each have the same structure (i.e., the same itemsets), but different itemset counts at each of the nodes. In a preferred embodiment of the invention, each node corresponds to two counts: (i) the current count of the related itemset since the last M transaction records 12 were read, and (ii) the total count for the itemset since it was generated and added to the hash tree arrangement.

Each processor 2 provides these two counts for each of the nodes of its hash tree in an array by making a transversal of the hash tree data. In the present invention, a pre-order transversal is preferred. Each processor 2 makes an identical transversal since the corresponding hash tree structures are identical. Accordingly, although the counts for each node may be different, elements of the consolidated arrays will contain counts of corresponding nodes of the hash trees from all of the processors 2.

The results of each processor's 2 count of the different itemsets are consolidated by performing a vector sum of the arrays. In a preferred embodiment of the present invention, the vector sum is performed in parallel using an ALL_REDUCE operation or the like. The ALL_REDUCE operation adds, or performs a similarly functioning associative operation on corresponding elements for each processor's 2 array and generates a new result array which is stored in accordance with each of the hash tree nodes. Specifically, the ALL_REDUCE operation adds together the corresponding two itemset counts from each processor 2 at each of the nodes or array positions. The aggregate results are stored for the corresponding tree nodes for each processor 2. Each processor 2 then performs a transversal again, adding the counts corresponding to the aggregate results to the total counts stored for each of the nodes of the different hash trees. Since each processor 2 uses the results of the ALL_REDUCE operation to update the total counts for all of the nodes of the hash tree, the resulting consolidated hash trees corresponding to each of the processors 2 are identical in counts as well as structure. This completes the first part of the consolidation of itemset counts.

The second part of the consolidation, identifying the new itemsets (and correspondingly new nodes), and using them to identify supersets, is performed independently at each node because of the minimal execution time involved (Steps 8 and 9 in FIG. 6). Here, each node uses the updated total itemset counts at the hash tree nodes to determine if the node represents a suspected large or suspected small itemset and if new itemsets must be generated from it. For each new immediate superset of an itemset, a new itemset is generated and tested (also in Step 9). This is done by adding an additional item, different from any of the items already present in the itemset and verifying that every subset of the newly generated superset is a suspected large itemset. If so, the newly generated superset is added to the itemsets already being counted, and is initially deemed a suspected small itemset. Step 9 is preferably performed independently at each processor 2. Since the total counts used by each processor 2 are identical (as per the ALL_REDUCE operation in Step 7), the Step 9 operation generates identical supersets and produces identical results. The resulting hash trees for each processor 2 are thus identical.

After Step 9 is performed, the processors 2 continue counting itemsets in equal shares of transaction records 12 (Step 18). After another M transaction records 12, the synchronization of Step 7 is repeated, as are the steps of updating nodes and generating itemsets (Steps 8 and 9). After every itemset has been fully counted and there are no new itemsets to add (Step 18), the confirmed large itemsets are generated and association rules are reported, in the same manner described above for serial processing (Step 20).

Figure 8:
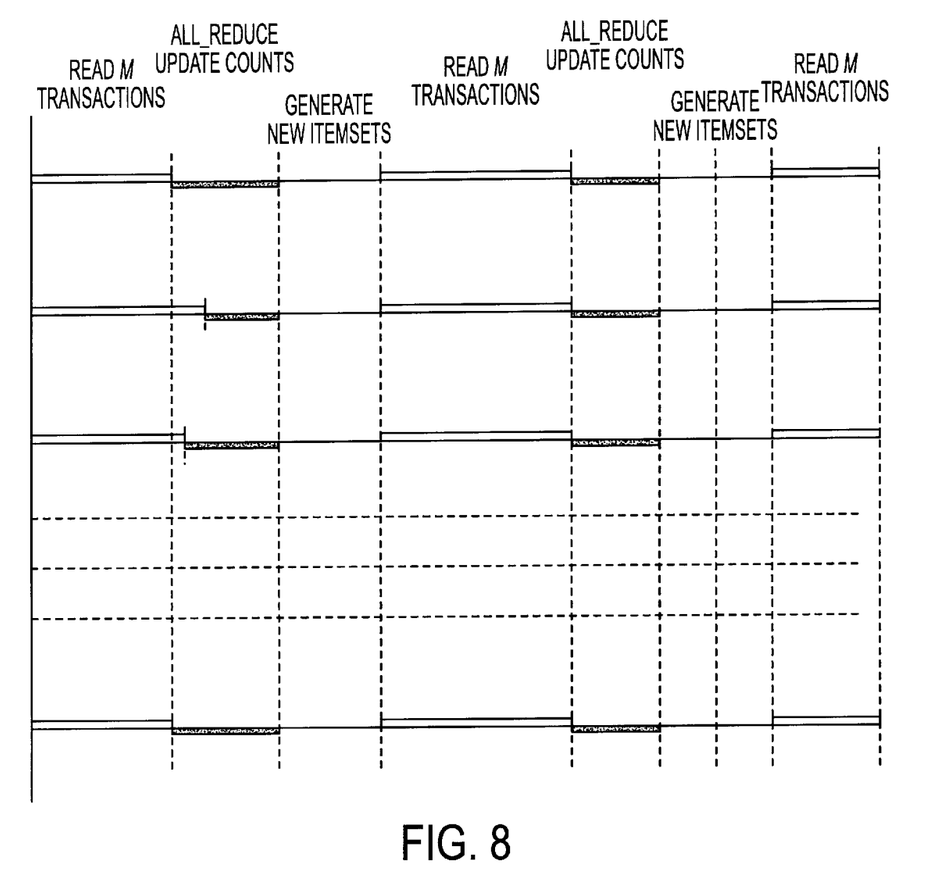
FIG. 8 is a graphical representation of the time sequence for performing several sections of the parallel processing according to one embodiment of the present invention.

The timing diagram in FIG. 8 shows the parallel execution of several processors 2 in the DIC 1 during the performance of Steps 6–18 (shown in FIG. 6). Each line plots the execution of Steps 6–18 on a single processor 2. Different line formats are used to graphically represent the various execution modes of the processor 2 as it runs in the DIC 1 system (these times are only depicted for the purpose of illustration and are not drawn to scale as per a real execution of the present invention). A double line is used to show the processor 2 time spent in reading transactions. This portion of the execution is parallelized, since the processors 2 read different portions of the data transactions 10 in parallel. A thickened line is used to represent the time spent waiting for other processors 2 to make the call to ALL_REDUCE, and to perform the communication and consolidation processing required for the ALL_REDUCE operation (Step 7 in FIG. 6). The portion of time depicted with the thickened line can be thought of as synchronization and communication overhead of the parallel method over the serial method. Finally, a normal line style is used to depict the time spent independently by each processor 2 in using the updated counts of the hash tree to generate new itemsets that are added. It should be noted that the portion of time depicted using the normal line style is not parallelized; each processor preferably executes this step of generating itemsets identically and independently.

There are several alternative embodiments for performing the consolidation or synchronization processing. As can be understood, the present invention transmits the aggregate counts from the ALL_REDUCE operation (Step 7 in FIG. 6) to every processor 2 and determines the new itemsets to add at each processor 2 independently. In an alternative embodiment of the present invention, the counts may be aggregated at a single processor 2, using a REDUCE operation, as is commonly known in the industry, instead of the ALL_REDUCE operation. The single processor 2 then determines the new itemsets to be added. This information (the new itemsets) is transmitted to every other processor 2 which then adds these new itemsets to its hash tree structure. This process is very effective especially when the number of new itemsets to add is relatively small compared to the total size of the hash tree, since it reduces the communication overhead of transmitting an array whose length is the size of the entire hash tree.

Another embodiment of the present invention provides for the parallel operation to determine the new itemsets out of the new counts of the hash tree. In this embodiment, the responsibility for determining new itemsets is divided between k independent processors 2 by dividing the hash tree into k equal-size portions and assigning each processor 2 to generate new itemsets out of the nodes in a single portion of the hash tree. At the end, all of the processors 2 communicate to aggregate their results: each processor 2 adds the new itemsets generated by every other processor 2, including the ones that are self generated. This increases the efficiency of generating new itemsets, especially when the hash tree is relatively large.

Figure 9:
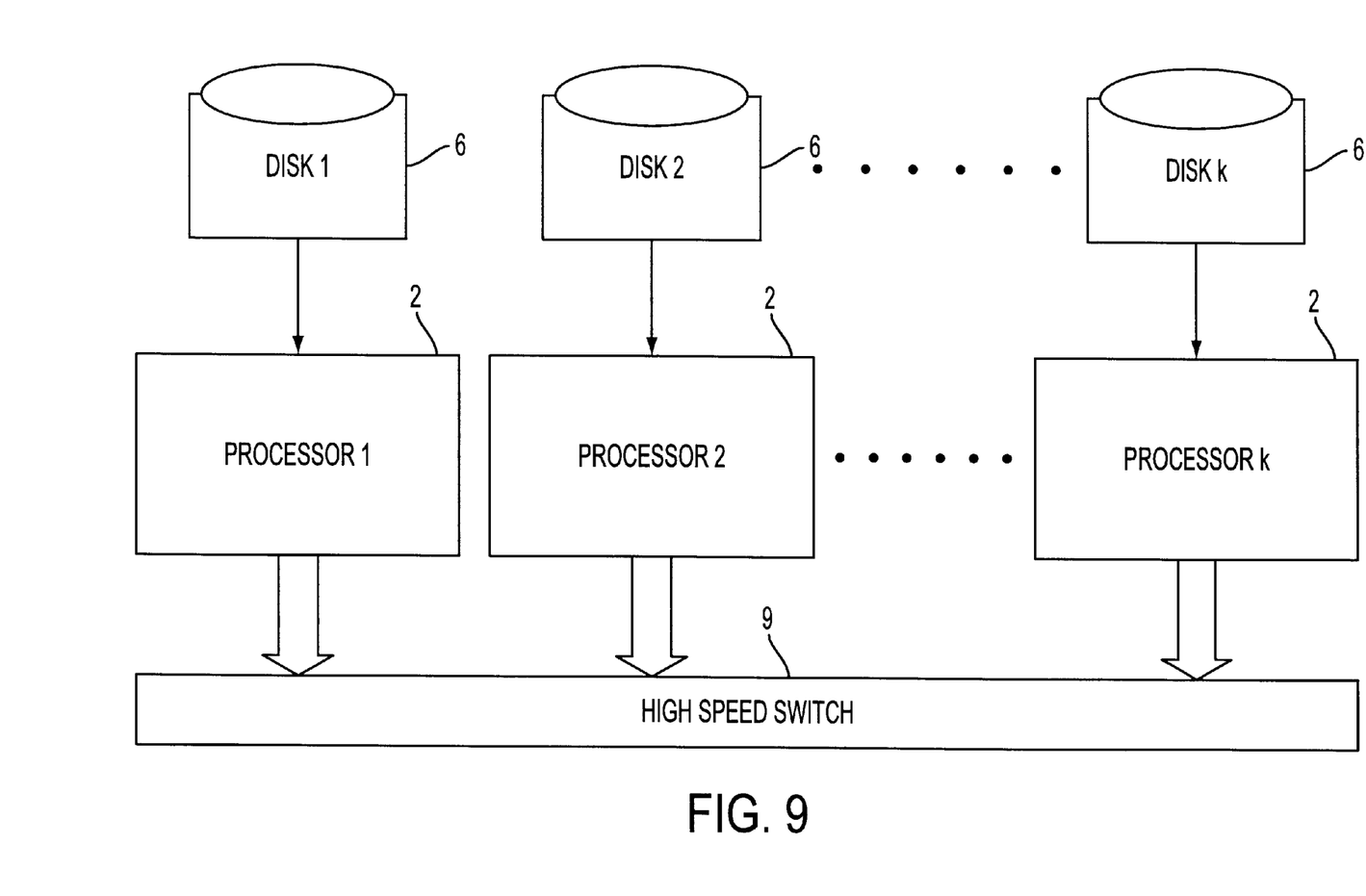
FIG. 9 is a diagram of a parallel implementation of the dynamic itemset counting system of the present invention using a plurality of interconnected processors and storage devices.

FIG. 9 shows an implementation of a parallel operation in one embodiment of the present invention using a "share-nothing" architecture, with individual disk storage 6 for each processor 2. As can be understood with large databases that cannot fit entirely on one disk 6, the database 10 may be partitioned such that parts of it are stored on several k disks 6. The plurality of k processor 2 individually corresponding to the k disks communicate using a high speed interconnect switch 9 for message passing among the processors 2. The interconnect switch 9 may be any system capable over providing a data communications link between the processors 2, including a communication network (e.g., Internet) suitable for performing in a distributed processing environment. In a preferred embodiment, the switch 9 supports a bandwidth of up to 40 MB/sec in full duplex.

A message passing library conforming to the Message Passing Interface standard ("MPI") as utilized in the industry, is also provided in the preferred parallel embodiment of the present invention. In particular, the MPI library is used to implement the ALL_REDUCE operation required to synchronize the data corresponding to the individual processors 2 (see Step 7 of FIG. 6).

When the process shown in FIG. 6 is run in a parallel embodiment of the present invention, the processors 2 produce individual counts for the itemsets as they read transaction records 12 from the data transactions 10. As the number of processors 2 used to perform the detection of recognized items increases, the performance of the DIC 1 as a whole increases almost linearly, but not in a one for one ratio. In one embodiment of the present invention using six processors 2, it was found that the serial method ran in about 4.5 times the duration required for the parallel processing. This is because the processing of each record 12 for recognized itemsets remains roughly the same since this function is not parallelized, detracting somewhat from the overall performance. In any case, reading the transactions 10 in parallel across multiple processors 2 provides distinct advantages over the serial embodiment of the present invention, and more importantly over the known prior art systems for data mining.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A method for selectively retrieving records that contain recognizable items from a plurality of records collectively stored seriatim in an electronic database, wherein said method comprises:

reading each record in the electronic database in a substantially sequential flow;

detecting each record that contains a first recognized item;

incrementing a first register to keep track of the records identified as containing said first recognized item;

continuously comparing the number of records in the first register to a preset value to determine if a first threshold has been reached;

reading each record that has been previously identified as containing a first recognized item, wherein the reading of said records containing a first recognized item begins at any record that has been previously identified as containing a first recognized item, and continues in a substantially sequential flow;

detecting in said records containing a first recognized item those records that also contain a second recognized item;

incrementing a second register to keep track of the records identified as containing a set having both of said first and said second recognized items;

continuously comparing the number of records in the second register to a preset value to determine if a second threshold has been reached; and repeating the above recited steps for sets having a plurality of recognized items until all recognized sets of items having a record count exceeding preset thresholds are detected.

2. A method for selectively retrieving records that contain recognizable items according to claim 1, said method further comprises detecting the last record in the collection of sequentially stored records and recirculating to the first record of the sequentially stored records to continue reading records identified as containing recognized items until each identified record from the collection of sequentially stored records has been read once.

3. A method for selectively retrieving records that contain recognizable items according to claim 2, said method further comprises analyzing the sets of items detected in the records stored in the electronic database to formulate probability rules that are indicative of the frequency association between different items in the plurality of records.

4. A method for selectively retrieving records that contain recognizable items according to claim 2, wherein the identifying and recording of sets of items further comprises storing said register values for each recognized item in a hash tree data structure.

5. A method for selectively retrieving records that contain recognizable items according to claim 1, wherein the detecting of records containing recognized items is performed concurrently by a plurality of processors, each of said processors provided for detecting a separate recognized set of items as it reads a record.

6. A method for selectively retrieving records that contain recognizable items according to claim 5, said method further comprises consolidating among said processors the number of records containing recognized sets of items, by updating each of said processors with the data related to the sets of items detected in the records with the data related to the sets of items detected by each of the other of said processors.

7. A method for selectively retrieving records that contain recognizable items according to claim 6, said method further comprises determining the recognized sets of items to be detected in the records read, after consolidating the data related to the sets of items detected by said plurality of processors.

8. A method of dynamically searching a collection of data records to detect records having sets of items (itemsets) and to form association rules corresponding to the itemsets detected, said method comprising the steps of:

a. reading data records in a seriatim manner;

b. incrementing a separate counter for each itemset detected in a record;

c. reading records that have already been detected as containing an itemset in step a, starting with any record having a first itemset and continuing in a sequential manner through records identified as having a first item set;

d. generating new itemsets;

e. incrementing separate counters for each itemset detected in a record;

f. returning to the beginning of any unread records after reading the last record in the collection of data records;

g. repeating steps a through f until every itemset has been counted; and h. creating association rules from the itemsets counted in steps a through g.

9. A method of searching a collection of data records according to claim 8, further comprising the step of classifying each itemset detected in a record as a suspected small itemset.

10. A method of searching a collection of data records according to claim 9, further comprising the step of comparing the count of a suspected small itemset to a predetermined threshold, and changing the classification of an itemset designated suspected small to suspected large after the count of a suspected small itemset exceeds the predetermined threshold.

11. A method of searching a collection of data records according to claim 10, further comprising the step of changing a suspected small itemset designation or a suspected large itemset designation to a confirmed small itemset designation or a confirmed large itemset designation, respectively, after every itemset in the collection of records has been counted.

12. A method of searching a collection of data records according to claim 8, further comprising the step of creating a hash tree data array having a plurality of nodes and branches, each path along different branches to a node corresponding to an itemset, wherein the itemset count for each itemset is stored with the corresponding node, such that each of the itemsets and its corresponding count is identified in the hash tree array.

13. A method of searching a collection of data records according to claim 8, wherein the collection of data records is partitioned into separate pluralities of records, and the plurality of records are read individually and concurrently by a plurality of processors.

14. A method of searching a collection of data records according to claim 13, further comprising the step of consolidating itemset counts among the processors the number of records detected as having at least one itemset, by updating each of said processors with the hash tree data array related to the itemsets detected in the records read by each of the other processors.

15. A method of searching a collection of data records according to claim 14, wherein the step of consolidating and updating the plurality of processors comprises performing a parallel vector sum of the hash tree data arrays corresponding to each of the processors in the plurality of processors.

16. A method of searching a collection of data records according to claim 14, further comprising the step of generating new itemsets to be detected based on preselected items or on the count of individual items found in the records already read, after performing the consolidation of the hash tree data arrays related to the itemsets already detected by said plurality of processors.

17. A method of searching a collection of data records according to claim 16, wherein the step of generating new itemsets further comprises generating supersets which include a plurality of itemsets having at least one common item among the itemsets.

18. A programmable general purpose computer apparatus for dynamically searching a file of records collectively stored in an electronic database, wherein said records contain at least one item, the search dynamically determining sets of items (itemsets) and searching for the generated itemsets among the records by starting at any record and reading the records in a sequential flow until all records before and after the initial record in the file are read, said apparatus comprising:

a processor means for performing decision making, control operations and data manipulation;

an array of memory storage means having address inputs and data inputs and outputs, for storing said records in different locations within said memory storage means during the search;

an address generation means having address outputs coupled to the address inputs of said memory storage means, for generating addresses to access different locations within said memory storage means; and an interface means having address inputs connected to the address outputs of said address generation unit.

19. A programmable general purpose computer apparatus for searching a file of records according to claim 18, further comprising a plurality of counters, wherein each of said counters stores a count of a separate itemset detected by said processor means.

20. A programmable general purpose computer apparatus for searching a file of records according to claim 18, further comprising a plurality of processor means coupled together by a switching means, and a plurality of external storage devices individually coupled to each of said processors, wherein records of said electronic database are stored in said external storage devices.

* * * * *